United States Patent [19]

Jakel

[11] Patent Number: 5,290,355
[45] Date of Patent: Mar. 1, 1994

[54] ROOFING SHINGLE COMPOSITION, METHOD OF FORMULATION, AND STRUCTURE

[76] Inventor: Karl W. Jakel, 3924 Park Pl., No. 4, Montrose, Calif. 91020

[21] Appl. No.: 868,846

[22] Filed: Apr. 16, 1992

[51] Int. Cl.⁵ .............................................. C04B 7/02
[52] U.S. Cl. ................................... 106/675; 106/698; 106/716; 106/DIG. 2
[58] Field of Search .................. 106/675, 698, DIG. 2, 106/716, 718, 719, 726, 728, 731

[56] References Cited

U.S. PATENT DOCUMENTS

| | | |
|---|---|---|
| 329,513 | 11/1885 | Underwood . |
| 1,469,543 | 10/1923 | Strachan et al. . |
| 1,575,183 | 3/1926 | Sinnett . |
| 2,057,003 | 10/1936 | Bugher . |
| 2,293,744 | 8/1942 | Miles et al. . |
| 2,450,562 | 10/1948 | Robinson et al. . |
| 2,510,416 | 6/1950 | Pretty . |
| 2,703,289 | 3/1955 | Willson .............................. 106/675 |
| 2,796,637 | 6/1957 | Miles . |
| 3,783,570 | 1/1974 | Storch ................................ 52/518 |
| 3,841,885 | 10/1974 | Jakel . |
| 3,852,933 | 12/1974 | Guzzo ................................ 52/540 |
| 3,852,934 | 12/1974 | Kirkhuff . |
| 3,862,532 | 1/1978 | Markos ............................... 52/521 |
| 3,870,775 | 3/1975 | Jakel . |
| 3,972,972 | 8/1976 | Yano et al. . |
| 4,131,670 | 12/1978 | Abate . |
| 4,166,749 | 7/1979 | Sterrett et al. ..................... 106/675 |
| 4,203,456 | 5/1980 | Miller ................................ 106/675 |
| 4,240,840 | 12/1980 | Downing et al. . |
| 4,288,959 | 9/1981 | Murdock . |
| 4,389,359 | 6/1983 | Brunt et al. . |
| 4,407,769 | 10/1983 | Harada et al. . |
| 4,514,947 | 5/1985 | Grail ................................. 52/536 |
| 4,608,216 | 8/1986 | Barsk . |
| 4,637,860 | 1/1987 | Harper et al. . |
| 4,662,141 | 5/1987 | Miko . |
| 4,663,104 | 5/1987 | Ito et al. . |
| 4,666,648 | 5/1987 | Brittain . |
| 4,673,659 | 6/1987 | Wood et al. ....................... 106/678 |
| 4,741,131 | 5/1988 | Parker ............................... 52/15 |
| 4,778,529 | 10/1988 | Barker et al. ...................... 524/4 |
| 4,778,718 | 10/1988 | Nicholls . |
| 4,781,816 | 1/1988 | Lee et al. . |
| 4,840,672 | 6/1989 | Baes .................................. 106/681 |
| 4,856,236 | 8/1989 | Parker ............................... 52/11 |
| 5,035,100 | 7/1991 | Sachs ................................ 52/741 |
| 5,047,086 | 9/1991 | Hayakawa et al. . |
| 5,059,371 | 10/1991 | Saheki et al. ...................... 264/108 |
| 5,108,679 | 4/1992 | Rirsch et al. ...................... 106/716 |
| 5,114,617 | 5/1992 | Smetana et al. ................... 106/675 |

*Primary Examiner*—Karl Group
*Assistant Examiner*—Paul Marcantoni
*Attorney, Agent, or Firm*—William W. Haefliger

[57] ABSTRACT

A formula of lightweight aggregates, fiber, and Portland Cement, which, when graded, prepared and mixed as described produces a lightweight, fire and thermal resistive concrete which can be successfully and easily extruded into shapes for use in construction, principally, roofing tiles, shingles and shakes. This mix can also be pressed into the same shapes and brick and block shapes. The resultant compressed product is homogeneous and uniform thus creating superior strength characteristics. This "concrete" is approximately half the weight of traditional concrete (specific weight is 0.85 to 1.0, or expressed in metric, 0.85 gr. per cc.) and is greater than half as strong and absorbs the same amount of water.

11 Claims, No Drawings

ROOFING SHINGLE COMPOSITION, METHOD OF FORMULATION, AND STRUCTURE

BACKGROUND OF THE INVENTION

This invention relates generally to the production of lightweight, fire resistant roofing shingles or tiles, and more particularly concerns the use of Portland cement in admixtures capable of extrusion to form such roofing pieces.

There is continuous need for improvements in processes to consistently produce strong, lightweight cementitious building products such as tiles, shingles, bricks, blocks, etc., and employing lightweight aggregates together with Portland Cement. In the past, such lightweight building products were difficult to produce, and suffered from undesirably low strengths.

Prior roofing tiles and methods of production are disclosed, for example, in Jakel U.S. Pat. No. 3,841,885, Jakel U.S. Pat. No. 3,870,777, Kirkhuff U.S. Pat. No. 3,852,934 and Murdock U.S. Pat. No. 4,288,959, and Wood U.S. Pat. No. 4,673,659 describing problems encountered in lightweight extruded tile production.

SUMMARY OF THE INVENTION

It is a major object of the invention to provide improvements in processes to make lightweight, cementitious building products of high strength and quality.

It is another object to provide a formulation of lightweight aggregates, as well as very lightweight aggregates which have been graded and prepared in a very specific manner, and which, when mixed with Portland Cement in prescribed sequence, and specified mixer speeds, will produce a "dry" or "wet" mix which can be easily formed using existing extruding, pressing or casting machines designed for standard concrete mixes, and which will produce product at very high speed on these machines without modifications to the machines. The object is to make production of such lightweight products very efficient and therefore relatively inexpensive, compared to the slower "wet" processes being used currently.

It is yet another object to provide an aqueous, yet "dry" mixture that is extrudible to produce lightweight cementitious roofing tiles or shingles, that consist essentially of the components:
a) expanded perlite in particulate form
b) an ingredient or ingredients selected from the group consisting of pumice, expanded shale and expanded clay that ingredient or those ingredients being in particulate form, and
c) Portland Cement in particulate form.

Such an admixture may also typically contain a small amount, by weight, of cellulose and/or polyester fiber. More specifically, the mix typically contains such components in relative weight amounts:
about 1 part of the above b) ingredient or ingredients,
about 1 part Portland Cement,
about ½ part expanded perlite.

A further object is to provide an improved method of processing, including pre-screening of the aggregate, in order to produce a superior product. Thus, by grading standard sources of pumice, expanded shale or clay and expanded perlite into specific particle sizes and then re-combining them in a prescribed manner and sequence, a mix is created which can be bound together using common Portland Cement giving superior physical strength and maintaining a compacted weight only slightly heavier by volume than the aggregates themselves. The two grades, when recombined create an optimum range of particle sizes to be coated by the cement. Prior lightweight mixes using these aggregates (and other similar) did not remove the high quantities of fines (smaller than 50 mesh) in pumice, (pumicite) expanded shale and perlite. These fines have enormous surface area and use up large quantities of cement to bind them, which results only in increased weight, thus defeating the reason for using lightweight aggregates. Additionally, such prior mixes using too many fines are difficult to extrude or press into shapes, since they resist flow and tend to "spring back" after the pressure is removed. The resulting product, if it can be formed at all, is generally very low in strength due to the low compaction resulting from improper aggregate particle size distribution.

Yet another object is to provide a formula of lightweight aggregates, and Portland Cement, with or without fiber addition, which, when graded, prepared and mixed as described produces a lightweight, fire and thermal resistive concrete which can be successfully and easily extruded, pressed or cast into shapes for use in construction. This mix can be extended, cast or pressed into tiles, shingles, brick, block and panel shapes using pressure and vibration as in a tile extruder, paver or block production machine. The resultant compressed product is homogeneous and uniform thus creating superior strength characteristics compared to present lightweight fiber cement mixes. This "concrete" is approximately half the weight of traditional concrete (specific weight is 0.7 to 1.2, or expressed in metric, 0.7 to 1.2 gr. per cc.) its compressive strength is in excess of 1,500 psi, and it absorbs the same amount of water.

These and other objects and advantages of the invention, as well as the details of an illustrative embodiment, will be more fully understood from the following specification and drawings, in which:

DETAILED DESCRIPTION

The basic admixture formula is as follows, with parts listed by relative weight in the composition: FORMULA: by weight
1 part Portland Cement
0.8 to 1.2 part Pumice (or expanded shale)
0.3 to 0.4 part expanded Perlite
0.015 to 0.025 part treated cellulose fiber (optional)
0.005 to 0.015 part Polyester fiber (optional)
0.2 to 0.3 part water (portion 1)
0.4 to 0.6 part water (portion 2)

GRADES

Where: The Portland Cement is Type II Common or Type III High Early or Type C Plastic.

Where: The Pumice or expanded shale or clay as received is dried to less than 1% moisture content and then screened to create a material having the following sieve analysis expressed in % by weight retained on screen:

| | |
|---|---|
| 4 mesh | 0-5 |
| 8 mesh | 10-20 |
| 16 mesh | 20-30 |
| 30 mesh | 30-50 |
| 50 mesh | 5-15 |
| Pan | 5 max. |

This material has a specific Weight of 0.80-0.90 weighing 40 to 60 lbs/ft$^3$.

Where: The expanded Perlite is screened (before or after expansion) to create a material having the following sieve analysis expressed in % by weight retained on screen:

| | |
|---|---|
| 8 mesh | 0-7 |
| 16 mesh | 30-40 |
| 30 mesh | 25-35 |
| 50 mesh | 15-25 |
| 80 mesh | 0-6 |
| Pan | 2 max. |

This material has a specific weight of 0.13-0.17 weighing 7 to 11 lbs/ft$^3$.

Where: The Polyester fiber is of 1.5 to 6.0 straight drawn and cut to 0.25 inch to 0.5 inch in length.

Where: The cellulose fiber is typically obtained from newsprint or kraft, opened fully by processing and moisture resistance treated.

PREPARATION

The Pumice, shale or clay preparation and handling prior to mixing must insure that the material does not segregate into concentrations of particle sizes within the grade. Anti-segregation methods of handling these aggregates must be employed in the transport and measuring systems.

The Pumice and/or shale must then be completely saturated with water (exposed to water until it stops increasing in weight) prior to mix start. Portion 1 of water is used for this purpose.

The Perlite must be handled (mixed for example) before and after expansion to insure that the particles do not segregate into concentrations of particle sizes within the grade. The Perlite may be either expanded "on demand" or handled insuring that the particles do not segregate prior to measuring and mixing.

MIXING

The sequence of the introduction of materials to the rotary mixer and the mixer rotor speeds and configuration are important:

1. The fiber, if used, is introduced into a rotating pan-high speed rotary mixer that has tip speeds in excess of 60 feet per second. Mix time continues until the fiber is completely opened.

2. Portland Cement is introduced into the fiber in the mixer and mixed at the same speeds until the fiber is fully dispersed into the cement.

3. The prepared Pumice or Shale is put into the mixer and rotor tip speeds reduced to 40 feet per second. The first portion of water has now been added. Mixing continues until homogeneity is reached.

4. Rotor tip speeds are further reduced to 10 to 12 feet per second prior to the introduction of Perlite. An alternate and preferred method is to transfer the mix from the rotating pan mixer to a folding paddle or screw type continuous mixer and to meter the Perlite into the mix.

5. The final mix with the second portion of water added may be at the low tip speed for very short time (10-15 seconds). Folding paddle or continuous screw (with back paddles) mixing is the preferred method to insure that the Perlite is not degraded by the mixing action.

Other common additives for concrete and lightweight cement or fiber cement products may be added at the appropriate places depending on the end use These additives could include iron oxides for coloring, calcium chloride for curing acceleration, water repellant chemicals, etc...

CURING

Product curing should begin immediately and in a controlled atmosphere. The humidity must be at least close to 80%. Temperatures can vary from 100° F. to as high as 170° (170 should not be exceeded) depending upon need for early strength in the particular product being produced.

FORMING AND SHAPING

By changing water content and making slight adjustments to fiber type and amount, the mix can be formed and shaped in a variety of ways.

The principle method is extrusion where the forming pressure is approximately 200 lbs. per square inch and the typical extrusion method is as used to produce concrete roof tiles on a carrier pallet which creates the shape of the bottom of the tile and a roller and slipper shape the top surface, curing proceeding on the pallet or pallets, after which the shingles are removed. The lightweight mix does not have the strength of a typical concrete mix and therefore the shape of the tile and the thickness are modified in order that the resulting cured tile can withstand foot traffic and pass the required "as installed" strength testing. The top surface of the tile which is shaped by the roller and slipper on the extrusion machine can be modified to produce any shape from a smooth European tile to a rough random shape of a cedar shake. The bottom surface is shaped by the pallet, and may be hollowed out.

Additionally, a shake shingle shape can be extruded using the same extrusion method. Additionally, the shingle underside may be hollowed out in the same manner as with the concrete tile to further reduce the installed weight.

The second method of forming and shaping employs a standard paver or block forming machine as this mix easily and consistently is handled by such a machine without modification. Thus, products currently produced using standard heavy concrete mixes can, by using the present mix, be also produced in a lightweight version. The shapes for roofing tiles and shake shingles may also be produced on these machines.

ADDITIONAL ADVANTAGES

The formula of light and very light aggregates with Portland Cement and cellulose fibers produces a strong, flexible, fire resistive and insulative concrete. This formula, when properly prepared and mixed is easily shaped by extrusion and vibrative pressure by unmodified industry standard machines used in making standard heavy traditional concrete.

A combination of various grades of light and very light aggregates combined in described quantities as disclosed creates a balance and uniformity of particle sizes. This combination of particle sizes, when combined with Portland Cement, produces a uniformly graded and therefore strong concrete referred to as "Perlacem".

The method of preparing very light aggregate as disclosed is such that the particle distribution will remain constant and not vary due to ore changes or by storage segregation. This eliminates the common problem of water "take-up" variation which creates forming and shaping problems.

The formula of light and very light aggregates, graded and prepared as disclosed is such that maximum binding effect of the Portland Cement is achieved. Previous lightweight mixes using the same aggregates embodied too many of the naturally occurring fines (very small particles of the minus 50 mesh variety) and thus created an ineffective cement paste.

The tile design may be such that the effective span of the installed tile is effectively substantially reduced as compared with standard tiles.

The present shake shingle can be hollowed out and made much thicker than those presently manufactured, and it may employ a sharp taper to achieve a flat layup on the roof.

I claim:

1. An aqueous admixture extrudible to produce lightweight cementitious roofing shingles, that consists essentially of the components:
   a) expanded perlite in particulate form,
   b) an ingredient or ingredients selected from the group consisting of pumice expanded shale and clay, said ingredient or ingredients being in particulate form, and initially completely water saturated, using 0.2 to 0.3 parts by weight of water,
   c) Portland cement in particulate form,
   d) said components being present in relative weight amounts:
      0.8 to 1.2 part Portland cement
      0.3 to 0.4 part expanded perlite,
   e) said b) ingredient or ingredients having sieve analysis expressed as percent by weight retained on a succession of screens as follows:

| Screen | % by weight |
| --- | --- |
| 4 mesh | 0–5 |
| 8 mesh | 10–20 |
| 16 mesh | 20–30 |
| 30 mesh | 30–50 |
| 50 mesh | 5–15 |
| Pan | 5 max. | and wherein the b) ingredient particulate has a specific weight of 0.80 to 0.90 and a density of 40 to 60 pounds per cubic foot,
   f) the final admixture containing additionally added 0.4 to 0.6 parts by weight of water.

2. The admixture of claim 1, including a small amount by weight, relative to each of said a), b) and c) components, of at least one of the following:
   cellulose fiber
   polyester fiber.

3. The admixture of claim 1 wherein sufficient water is present to form an admixture that extrudes into a coherent, uncured, shingle-shaped mass.

4. The admixture of claim 1 including 0.015 to 0.025 part cellulose fiber, by relative weight.

5. The admixture of claim 4 including 0.005 to 0.015 part by weight polyester fiber.

6. The admixture of claim 1 wherein the a) ingredient has sieve analysis expressed as percents by weight retained on a succession of screens, as follows:

| Screen | % by weight |
| --- | --- |
| 8 mesh | 0–7 |
| 16 mesh | 30–40 |
| 30 mesh | 25–35 |
| 50 mesh | 15–25 |
| 80 mesh | 0–6 |
| Pan | 2 max. |

7. The admixture of claim 6 wherein ingredient a) has a specific weight of about 0.13 to 0.17 and a density of 7 to 11 pounds per cubic foot.

8. The admixture of claim 6 wherein the Portland Cement is selected from the group:
   Type II common
   Type III High Early Strength
   Type C plastic.

9. The admixture of claim 4 wherein the cellulose fiber is derived from newsprint or Kraft paper, and characterized as opened fully and moisture resistant.

10. The produce shingle produced from an aqueous admixture extrudible to produce lightweight cementitious roofing shingles, that consists essentially of the components:
   a) expanded perlite in particulate form,
   b) an ingredient or ingredients selected from the group consisting of pumice, expanded shale and clay, said ingredient or ingredients being in particulate form, and
   c) Portland cement in particulate form, said produce single produced by the method employing a rotary blade mixer and including the steps:
      i) adding ingredient c) to the mixer and operating the mixer to disperse same,
      ii) then adding ingredient b) to the mixer and operating the mixer with a first water portion added to produce mix homogeneity, said first water portion being between 0.2 to 0.3 parts by relative weight,
      iii) continuing operation of the mixer, at reduced speed, iv) adding ingredient a) and continuing mixing of the mix at a reduced mixing level and with a second portion of water added, said second water portion being between 0.4 and 0.6 parts by relative weight,
      v) and forming the produce shingle from said mix, and curing the shingle,
   d) said components being present in relative weight amounts:
      0.8 to 1.2 part b) ingredient or ingredients
      about 1 part Portland cement
      0.3 to 0.4 part expanded perlite,
   e) said b) ingredient or ingredients having sieve analysis expressed as percent by weight retained on a succession of screens as follows:

| Screen | % by weight |
| --- | --- |
| 4 mesh | 0–5 |
| 8 mesh | 10–20 |
| 16 mesh | 20–30 |
| 30 mesh | 30–50 |
| 50 mesh | 5–15 |
| Pan | 5 max. | and wherein the b) ingredient particulate has a specific weight of 0.80 to 0.90 and a density of 40 to 60 pounds per cubic foot.

11. The produce of claim 10 including, prior to said step i), adding fiber to the mixer and operating the mixer to open the fiber, the fiber selected from the group: 0.015 to 0.025 parts by weight cellulose fiber, and 0.005 to 0.015 parts by weight polyester fiber.

* * * * *